Figure 1:
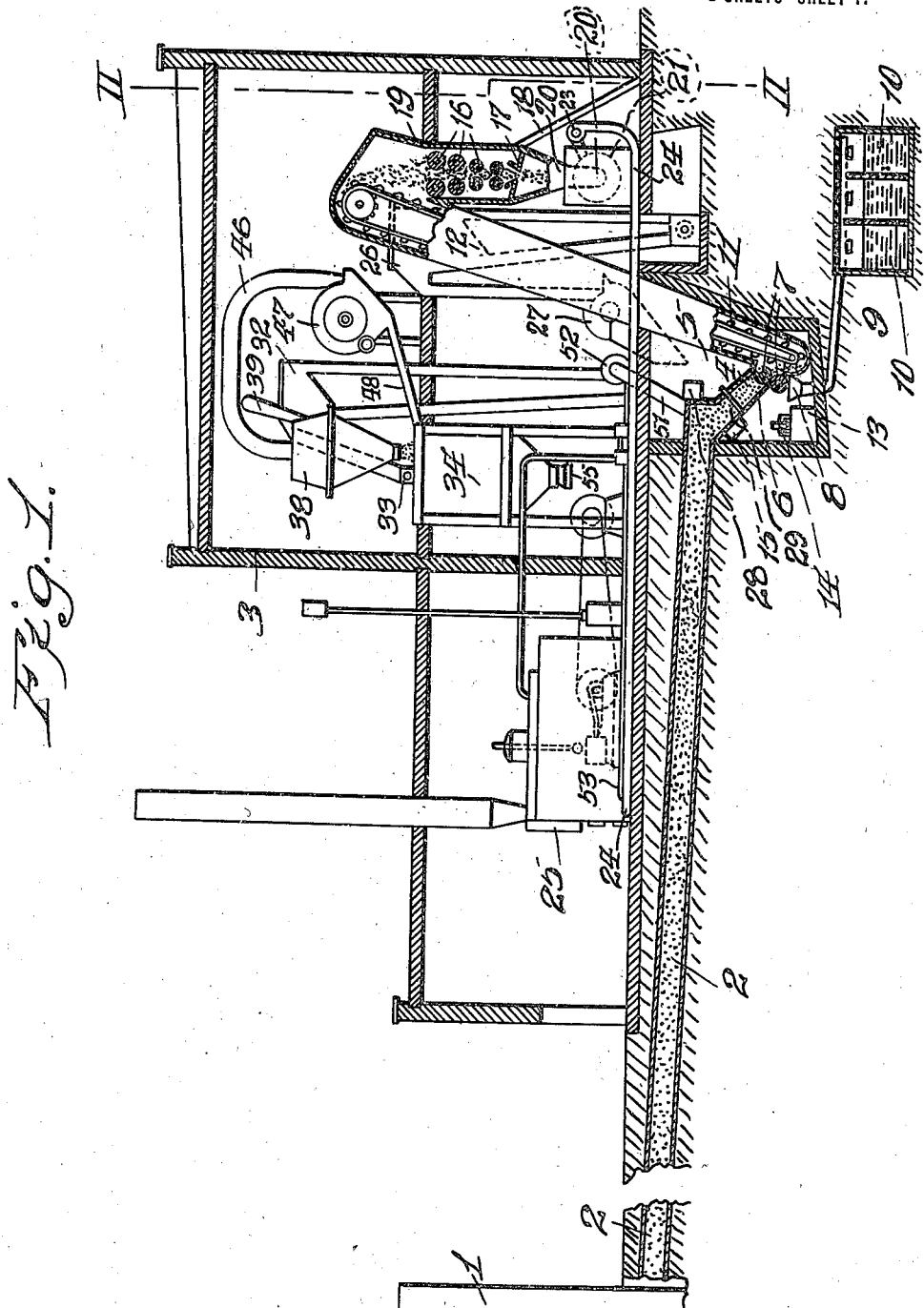

H. F. W. BROCKHAUSEN
APPARATUS FOR REDUCING GARBAGE.
APPLICATION FILED JAN. 2, 1917.

1,321,006.

Patented Nov. 4, 1919.
2 SHEETS—SHEET 1.

Inventor
Henry F. W. Brockhausen.
By H. G. Fletcher atty.

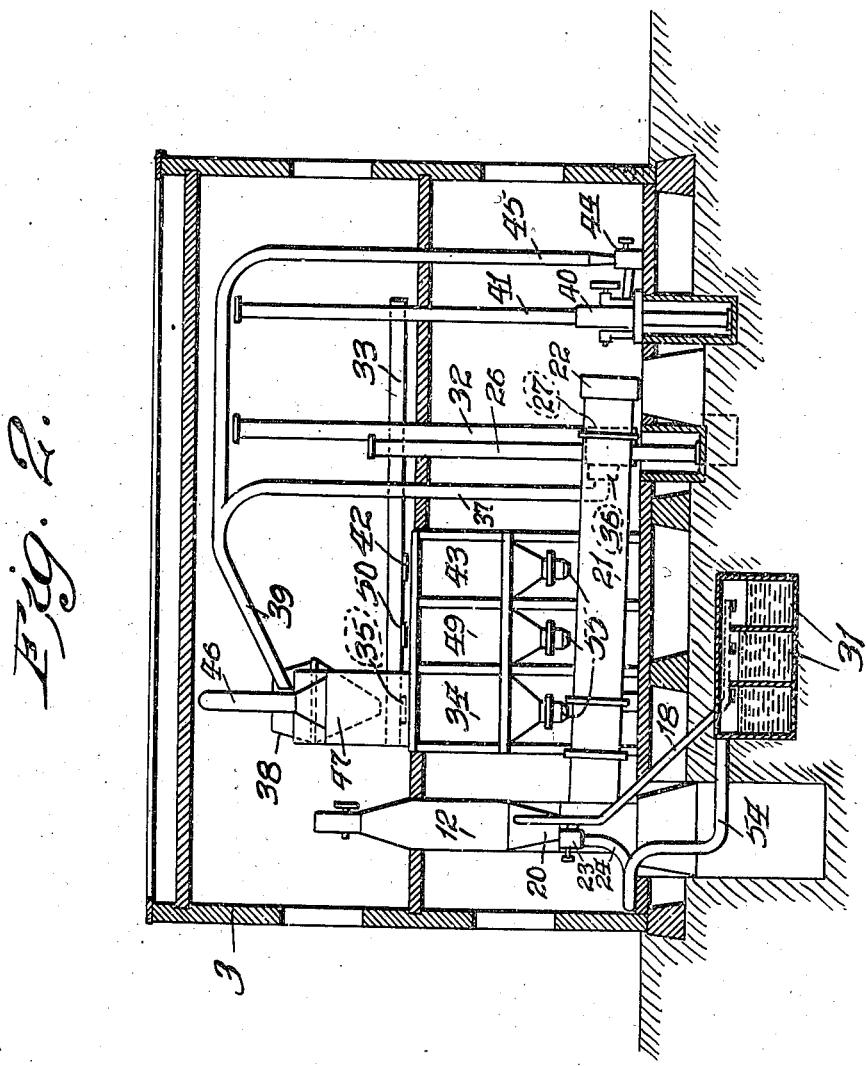

UNITED STATES PATENT OFFICE.

HENRY F. W. BROCKHAUSEN, OF ST. LOUIS, MISSOURI.

APPARATUS FOR REDUCING GARBAGE.

1,321,006.  Specification of Letters Patent.  Patented Nov. 4, 1919.

Application filed January 2, 1917. Serial No. 140,048.

*To all whom it may concern:*

Be it known that I, HENRY FREDERICK WILLIAM BROCKHAUSEN, a citizen of the United States of America, and a resident of the city of St. Louis and State of Missouri, have invented certain new and useful Improvements in Apparatus for Reducing Garbage, of which the following is a specification.

This application is a carrying forward of the invention contained in Patent No. 1,210,408 granted to me January 2, 1917, on garbage reduction and transportation system.

The primary object of this invention is to provide an improved apparatus or plant for treating the garbage relative to reducing the same to a fertilizer, and for recovering oils and fats and the like contained in the garbage, all of which is done in an absolutely sanitary manner.

Other and further objects will appear in the specification and be specifically pointed out in the appended claims, reference being had to the accompanying drawings exemplifying the invention, and in which, Figure 1 is a longitudinal section taken through this improved fertilizer plant.

Fig. 2 is a transverse section taken approximately on the line II—II of Fig. 1.

Referring to the drawings, 1 designates a garbage receiving plant, and leading from said plant is a conveyer or conduit 2, said conduit being preferably constructed on an incline, and leading to the fertilizer plant 3. The discharge end 4 of the conduit 2 is located in a pit or cellar 5, said discharge end 4 of said conduit having a perforated bottom 6. Located adjacent said discharge end 4 are a pair of squeezing rollers 7, and located beneath said rollers is a catching funnel 8 which communicates with a discharge pipe 9, said pipe being controlled so as to supply the settling basins 10.

Located adjacent said squeezing rollers 7 is one end of a bucket conveyer 11, said conveyer being inclined upwardly and extending into the fertilizer plant. Surrounding said conveyer is a housing 12, the lower end of said housing adapted to receive the discharge from the squeezing rollers 7. Located beneath the perforated bottom 6 is a drip pan 13, and operably related to said drip pan is a grease scalper 14, and located adjacent the discharge end 4 of the conduit is a heat emitting element 15. Located adjacent the upper or discharge end of the conveyer 11 are a series of pairs of heated graduated pressing rollers 16, and located beneath the lower pair of said rollers is a drip pan 17, and leading from said drip pan is a drain pipe 18. Surrounding said pressing rollers 16 is a housing 19.

Leading from the lower end of the housing 19 is a discharge spout 20, said spout being in communication with one end of a combined rotary steam drier and agitator 21, said rotary drier being heated by steam coils which are located in the steam head 22, and there being air entrained through the steam head 22 and through the rotary drier 21 by the suction fan 23. Leading from the suction fan 23 is a discharge pipe 24, said pipe being in communication with the furnace of the boiler.

As shown in Fig. 2, the rotary drier 21 is mounted on an incline. This is for the purpose of providing means of conveying the garbage toward the steam head 22. Located adjacent the discharge end of the rotary drier 21 is a receiving elevator 26, and in communication with said elevator is a pulverizer 27.

As related in my aforesaid application for patent on improved garbage reduction and transportation system, the garbage upon being received at the garbage reduction plant is treated and cleaned so that when the garbage is discharged from the receiving plant 1 into the conduit 2 it is in a perfect state for flushing, on account of the large quantity of water which has been mingled therewith, and inasmuch as the conduit is on somewhat of an incline, the garbage will flow through said conduit toward the fertilizer plant 3, and to assist the flow, a vacuum pump 28 is located adjacent the discharge end of the conduit 2.

In a system of this improved character, it is thought preferable to have the fertilizer plant located at a great distance from the garbage receiving plant and the underground conduit connecting said plants, in which the garbage receiving plant could be located at the limits of a city, whereas the fertilizer plant could be located in the suburbs. As the garbage travels in the conduit from the garbage receiving plant 1 to the fertilizer plant 3, the action of the water on the garbage will create certain acids and tend to withdraw certain oils and fats from the garbage.

In receiving the garbage from the discharge end 4 of the conduit, the valve 29 is opened so that the garbage can be acted upon by the squeezing rollers 7, and as the garbage travels over the perforated bottom 6 of the discharge end 4, a certain amount of the liquid contained in the garbage will fall through the perforations into the drip pan 13, and the grease that is contained in the liquid when received by the drip pan will be removed therefrom by the scalper 14. In order to reduce the grease that is contained in the garbage to an oily state so that the same can be acted on by the scalper 14, the heat emitting element 15 is adapted to heat the garbage as it arrives adjacent the discharge end 4.

The garbage upon passing through the squeezing rollers 7 is received by the buckets of the conveyer 11 and carried on upwardly to the upper end of the conveyer where it is discharged on to the graduated pressing rollers 16.

During the squeezing operation of the rollers 7, the juices that were squeezed out of the garbage will be received by the funnel 8 and conveyed through the discharge pipe 9 to the settling basins 10. The garbage upon being acted on by the graduated drying rollers 16 will be in a somewhat heated condition and will be discharged through the discharge spout 20 into the receiving end of the rotary drier 21.

While the garbage was being acted on by the heated rollers 16, the liquid or juices that were derived therefrom will be received by the drip pan 17 from which the liquid will be discharged into the drain pipe 18 and to the series of inclosed settling basins 31. During the passage of the garbage into the rotary drier, the air which is entrained through said drier will carry out obnoxious odors therefrom, and the same will be discharged into the discharge pipe 24 and to the furnace where they are consumed.

After the garbage has traveled through the rotary drier it will be received by the elevator 26 and then discharged into the pulverizer 27 where it is ground and pulverized. After the garbage has been worked upon by the pulverizer 27 it is discharged into the elevator 32, said elevator conveying the pulverized garbage to a conveyer 33, said conveyer carrying the pulverized garbage to and depositing it in a storage bin 34, through a discharge chute 35. A suction fan 36 is used in connection with an exhaust pipe 37 for the purpose of withdrawing dust from the pulverizer 27 and discharging it into a collector 38, from the discharge end 39 of the pipe 37.

From the aforesaid treatment relative to the squeezing of the garbage, then drying the garbage and afterward pulverizing said garbage, an improved fertilizer is derived therefrom, and in fact, if the garbage is of a proper grade, the ground product can be used as a food for cattle. In squeezing the garbage and extracting the liquids therefrom, certain oils and fats are derived, which have certain values and the sediment collected in the basins 10 and 31 will make a good fertilizer.

In order to enrich the pulverized garbage, limestone is ground in the pulverizer 40 and is discharged therefrom into an elevator 41, said elevator adapted to discharge the pulverized limestone into the conveyer 33, from which the limestone is discharged through the control discharge outlet 42 into the storage bin 43.

To remove dust from the lime stone pulverizer 40, a suction fan 44, which is operably related to a discharge pipe 45 is in communication with the discharge end 39 of the pipe 37 and said pulverizer 40, the dust from said pulverizer 40 being discharged into the collector 38.

The pulverized garbage and limestone dust accumulated in the collector 38 is then discharged into the bin 34. In order to further assist the work of the collector 38, the dust pipe 46 is connected with the top of said collector and leads to another collector 47, and leading from said collector 47 is a discharge pipe 48 which leads to the bin 34. When pulverized garbage is being conveyed from the garbage pulverizer 27 through the conveyer 33, the pulverized limestone elevator 41 will be inoperative. When pulverized limestone is being conveyed from the limestone pulverizer 40 through the conveyer 33 to the bin 43, the elevator 32 will be inoperative.

When it is desired to convey a mixed product of pulverized garbage and limestone through the conveyer 33 to the mixing bin 49, both pulverizers 27 and 40 with their respective elevators 32 and 41 will be in operation, and the mixed product will be discharged from the conveyer 33, through controlled discharge outlet 50. To provide means of getting rid of the foul gases from the garbage before the garbage from the conduit 2 passes through the squeezing rollers 7, a foul air pipe 51, which communicates with the discharge end of the conduit and an exhaust fan 52 will discharge the foul gases into the pipe 53 which leads to the furnace of the boiler 25. Foul gases are removed from the basins 31 by the pipe 54 which leads to the pipe 24.

In packing for shipping the pulverized garbage, pulverized limestone and mixed material, said materials can be withdrawn from their respective bins 34, 43 and 49 through their respective regulated discharge spouts 55.

From the aforesaid, it is readily seen that practically all of the by products of garbage can be taken care of by drying and pulverizing the treated garbage, and by extracting the oil, fats and acids therefrom.

What I claim is:

1. An apparatus for treating garbage comprising a garbage delivering conduit, a pressing member for receiving the garbage from said conduit, a heat emitting element located adjacent the discharge end of said conduit, a conveyer for removing the garbage from said pressing member, pressing rollers located adjacent the discharge end of said conveyer, and a drying device for drying the garbage after the garbage has been passed through said rollers.

2. An apparatus for treating garbage comprising a garbage delivering conduit, said conduit at its discharge end having a perforated bottom, a pressing member for receiving the garbage from said conduit, a catching member for receiving the juices from said pressing member, a conveyer for removing the garbage from said pressing member, pressing rollers located adjacent the discharge end of said conveyer, and a drying device for drying the garbage after the garbage has passed through said rollers.

3. An apparatus for treating garbage comprising a garbage delivering conduit, a pressing member for receiving the garbage from said conduit, a conveyer for removing the garbage from said pressing member, pressing rollers located adjacent the discharge end of said conveyer, and a drying device for drying the garbage after the garbage has passed through said rollers.

4. An apparatus for treating garbage comprising a garbage receiver, a squeezing device for acting on the garbage as it leaves said receiver, a conveyer leading from said squeezing device, a plurality of heated rollers located adjacent said conveyer, a rotary drier for receiving the garbage from said rollers, and a pulverizer for acting on the garbage after it has passed through said rotary drier.

5. An apparatus for treating garbage comprising a garbage delivering conduit, said conduit at its discharge end having a perforated bottom, a heat emitting element for heating the contents of said conduit as said contents pass therefrom, a pressing member for receiving the garbage from said conduit, a catching member for receiving the juices from said pressing member, a conveyer for removing the garbage from said pressing member, pressing rollers located adjacent the discharge end of said conveyer, and a drying device for drying the garbage after the garbage has passed through said rollers.

6. An apparatus for treating garbage comprising a garbage receiver, a squeezing device for acting on the garbage as it leaves said receiver, a conveyer leading from said squeezing device, a plurality of heated rollers located adjacent said conveyer, a rotary drier for receiving the garbage from said rollers, a pulverizer for acting on the garbage after it has passed through said rotary drier, and settling basins for receiving the juices extracted from said squeezing device and said rollers.

HENRY F. W. BROCKHAUSEN.